Feb. 22, 1966 — A. B. STILES — 3,236,783
MANGANO-CHROMIA-MANGANITE CATALYST CONTAINING CHROMATES
Filed June 9, 1961
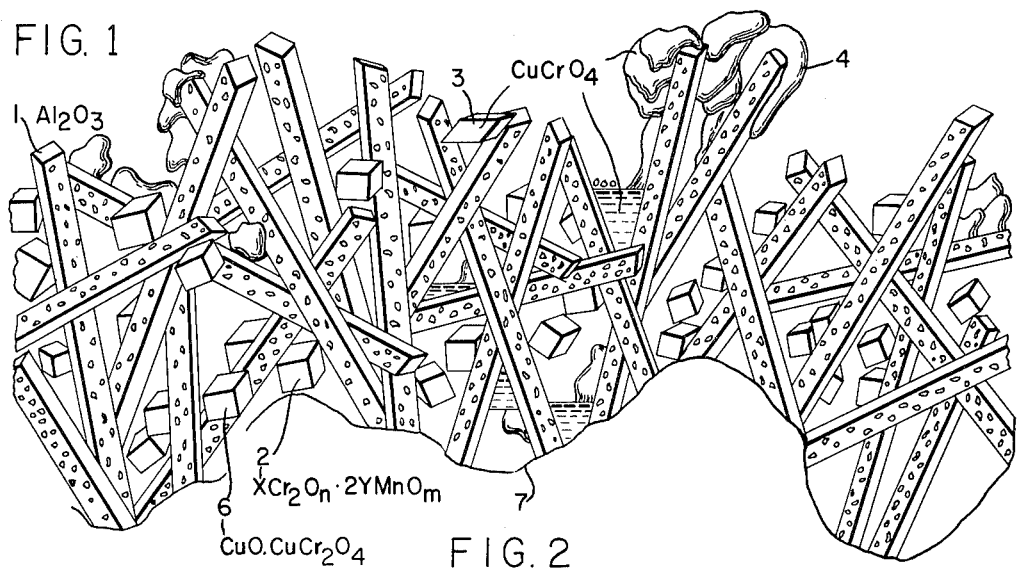
FIG. 1
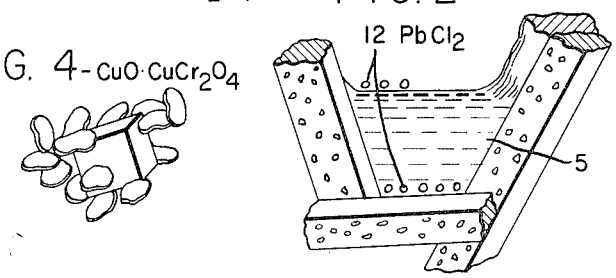
FIG. 2
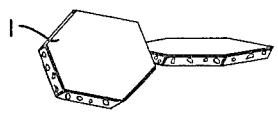
FIG. 3 - $Al_2O_3$
FIG. 4 - $CuO \cdot CuCr_2O_4$
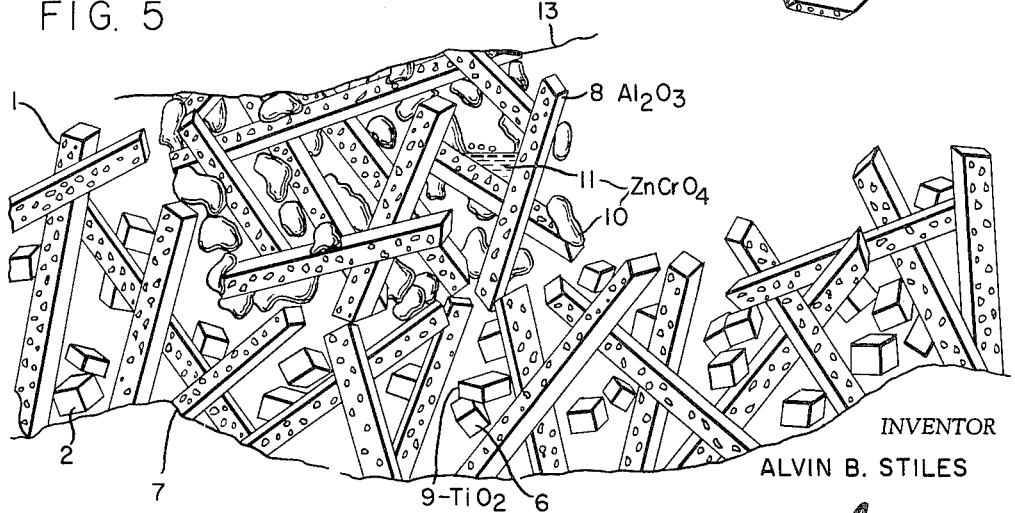
FIG. 5
INVENTOR
ALVIN B. STILES
BY Albert B. Griggs
ATTORNEY

3,236,783
MANGANO-CHROMIA-MANGANITE CATALYST CONTAINING CHROMATES
Alvin B. Stiles, Charleston, W. Va., assignor to E. I. du Pont de Nemours and Company, Wilmington, Del., a corporation of Delaware
Filed June 9, 1961, Ser. No. 116,172
4 Claims. (Cl. 252—465)

This invention relates to the treatment of automobile exhaust gases which contain such products as nitrogen oxides, carbon monoxide, and hydrocarbons and which additionally contain the products of combustion of alkyl lead anti-knock compounds. The invention is more particularly directed to mangano-chromia-manganite catalysts the particles of which are contiguous to a metal chromate selected from the group consisting of the chromates and dichromates of copper, iron, nickel, cobalt, cadmium, zinc, bismuth, thorium and cerium and to the use of such products for the catalytic oxidation of the components of the combustion of leaded fuels in automobiles.

In the drawings:
FIGURE 1 is an artist's conception of the mode of contiguous association of materials in the catalysts of the invention,
FIGURE 2 is a more detailed illustration of the section in dotted lines in FIGURE 1,
FIGURE 3 shows monoclinic crystals of alumina, $Al_2O_3$, as pseudohexagonal crystals,
FIGURE 4 shows the copper chromite crystallites in greater detail, and
FIGURE 5 shows a modified embodiment in which metal chromates are present as discrete particles.

Mangano-chromia-manganites are described and claimed as catalysts for the treatment of automobile exhaust gases in the following patent applications: Howk and Stiles, U.S. Ser. No. 109,483, filed May 19, 1961; Howk and Stiles, U.S. Ser. No. 59,263, filed September 29, 1960.

The mangano-chromia-manganite catalysts as described are exceedingly effective for the treatment of automobile exhaust gases. They are characterized by low temperature light-off, long life, and comparatively low cost. The catalysts work best however with fuel which does not contain much lead and with leaded fuels give good results but the activity of the catalysts falls off during use.

According to the present invention the mangano-chromia-manganite catalysts of the above tabulated cases are protected from the products of combustion of leaded gasoline by the incorporation of a metal chromate.

Before proceeding to a detailed description of the invention, reference should be had to FIGURE 1 for a general description of the catalyst systems of the invention.

In FIGURE 1 there is shown at 1 the alumina of a typical refractory support. This is illustrated as monoclinic crystals of the hydrate. Electronmicrographs of alumina of the type here employed show that these can be more accurately represented as monoclinic crystals which are pseudohexagonal crystals as illustrated in FIGURE 3. It is noted that the holes showing at 1 in FIGURE 1 and at the edges of the hexagonal crystals in FIGURE 3 represent fissures from which water has evolved.

Mangano-chromia-manganite is illustrated at 2 as a cube. A co-catalyst, copper chromite, is illustrated as a cubic crystal at 6 and is perhaps more accurately represented in FIGURE 4 in which the CuO is shown as small appended crystallites upon a copper chromite cube. A typical metal chromate according to the invention, copper chromate, is illustrated as an amorphous mass 4 and is also shown in molten form at 5. The copper chromate is illustrated as a rhombohedral crystal at 3.

As will be noted later, it is important that the metal chromate particles be associated with the catalyst particles in such a manner as to be contiguous but it is preferred that they not be intermixed as by coprecipitation though this can be done.

In the system illustrated in FIGURES 1 and 2 there will be seen a pool of copper chromate shown at 5. It is believed that the activity of catalysts of the invention in the presence of lead compounds arises from the fact that the copper chromate becomes molten at temperatures encountered on the catalyst support surface and lead components illustrated at 12 by $PbCl_2$, gather upon the liquid and then gravitate downward as shown in FIGURE 2. They are thus sequestered with respect to the mangano-chromia-manganite. At the same time there may be some lead metal chromate formed which may add activity.

It will be understood that while this explanation of function is believed to account for the data and the facts now available, it may be that some other explanation is equally consistent. It is possible, for example, that the lead compounds of whatever nature are reacted with the chromate without substantial fusion.

THE MANGANO-CHROMIA-MANGANITE CATALYSTS

The mangano-chromia-manganite catalysts to be used according to the invention are described and claimed as such and with co-catalysts, interspersants, and supports in our co-pending applications above mentioned and reference can be had to such applications for further details. A general description should be sufficient here.

The mangano-chromia-manganites have the following empirical chemical composition:

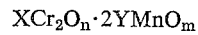

$$XCr_2O_n \cdot 2YMnO_m$$

in which $n$ can be 2, 3, and 6 and $m$ can be 1, 1.33, 1.5, 2, and 2.5. The Mn:Cr weight ratio can vary from 3:0.5 to 3:30. The atomic ratio, that of Y:X, is substantially the same and thus when Y equals 3, X can equal 0.5 to 30.

A mangano-chromia-manganite can be prepared having a ratio of Mn:Cr of 3:2 according to methods of Lazier U.S. Patent 1,746,782 and 1,964,001 and Wortz U.S. Patent 2,108,156. In these and other prior suggestions of manganese chromites it is proposed that equimolecular amounts of the manganese compound and the chromium compound be used which in aqueous solutions results in a product having a ratio of 3:2 because a third of the chromium is not precipitated and is washed away.

The mangano-chromia-manganites can be prepared by procedures which are described in detail in the Howk and Stiles applications above mentioned. Generally, it can be said that they are prepared by reacting appropriate salts of manganese and chromium in aqueous solution. Thus manganese nitrate and chromic acid anhydride are dissolved in water and ammonia is added to make a precipitate. The products of high manganese ratio can be prepared by adjusting the amounts of components, but a high chromium product can be made when a hexavalent chromium salt is used as a chromium source only by adding further chromium compound, such as ammonium chromate, to the precipitate thus prepared after filtration. Alternatively the appropriate proportion of suitable salts such as manganese nitrate with chromium nitrate can be precipitated or fused together to give mangano-chromia-manganites of the desired Mn:Cr ratio.

CO-CATALYST

A co-catalyst can be included with the mangano-chromia-manganite and there can be used, for example, such co-catalysts as those described in Patent No. 1,964,001. Thus one of the following can be added as the carbonate or can be added as a basic chromate or oxide:

Copper
Nickel
Zinc
Iron
Cadmium
Cobalt
Tin
Bismuth.

The co-catalysts can, of course, be added as other compounds depending upon the specific treatment and processing conditions used.

The weight ratio of co-catalyst:mangano-chromia-manganite can vary greatly and can range from, say, 10:1 to 1:10. About 1:1 is preferred.

INTERSPERSANTS

It is often desirable to add an interspersant to the catalyst aggregate as described in the above mentioned Howk and Stiles applications. The interspersants are refractories which have a melting point about 1000° C. and more preferably above 1600° C. The crystallite size of the refractory should be such that its crystallites keep the crystallites of the mangano-chromia-manganite apart. The refractory crystallites serve a similar function with crystallites of co-catalysts which are present.

The interspersants which can be used include such water-soluble precipitates as:

(1) Aluminum oxide and hydroxide
(2) Titania
(3) Thoria
(4) Ceria
(5) Chromia
(6) Magnesia
(7) Calcium oxide and hydroxide
(8) Barium oxide and hydroxide
(9) Strontium oxide
(10) Zinc oxide
(11) Manganese oxide
(12) Silica
(13) Beryllia
(14) Zirconia
(15) Lanthana
(16) Hafnia.

Aluminum hydroxide, which is present as oxide in the final product, is preferred. Manganese oxide and chromia are listed as interspersants to be added in amounts exceeding those which would be present in the mangano-chromia-manganite of the ratios described.

It is to be noted that the interspersants can be added in the first precipitation or formation of the catalyst aggregate and a second interspersant can be added after the catalyst aggregate has been formed and especially after it has been heat-treated or calcined. The interspersants can be heat-decomposable products or they can be introduced in the form of sols or dispersions.

The amount of the interspersants can be widely varied and the total of the first interspersants can run from, say, 5 to 75% based upon the weight of mangano-chromia-manganite plus a co-catalyst if there is one. A second interspersant can range in amount from 0.5 up to 50% or even more by weight of the weight of the catalyst aggregate to which it is added.

Further details of the introduction of co-catalysts and interspersants can be found in the Howk and Stiles applications previously mentioned.

THE METAL CHROMATE

According to the present invention the mangano-chromia-manganite catalyst is modified by associating with it particles of a metal chromate or metal dichromate in contiguous relation to the particles of catalyst. When reference is made herein to metal chromates this will ordinarily refer to both metal chromates and metal dichromates in accordance with customary terminology.

The metal chromates to use are the chromates and dichromates of:

Copper
Iron
Nickel
Cobalt
Cadmium
Zinc
Bismuth
Thorium
Cerium.

The metal chromates can be separately prepared and applied to a catalyst support either before or after the catalyst has been applied. They can of course be applied simultaneously as will be illustrated. Instead of preparing the chromates separately they can be prepared in situ as by applying a solution of chromium trioxide together with, for example, copper nitrate. Upon heating this will form copper chromate. Further examples of preparations in situ and separate preparations will be given hereinafter.

The amount of metal chromate to use can be widely varied because if too much is used it is merely wasteful and if too little is used the catalyst is still effective but does not obtain the full benefits of the invention. Generally it will be found satisfactory to use a proportion of the metal chromate to the mangano-chromia-manganite by weight of 10:1 to 0.1:1. The most preferred proportions are nearer the lower end of the range using amounts of metal chromate to catalyst in the vicinity of 1:1.

The mangano-chromia-manganite and the metal chromates can be mixed as powders and pilled, tableted or pelleted.

Precipitates of the mangano-chromia-manganite and of the metal chromate can be separately prepared and then brought together and spray dried simultaneously.

A contiguous relation between the particles of catalyst and metal chromate can best be obtained and a catalyst of high effectiveness and relatively low cost can be made by applying the catalyst and metal chromate to a refractory support. First one and then the other can be applied to the support. The mangano-chromia-manganite catalyst can also be formed in situ on the support as will be illustrated hereafter.

As will be illustrated in the examples the metal chromate can be coprecipitated with the catalyst. This is a less preferred embodiment of the invention. It is to be noted that in catalysts of the invention which contain a mangano-chromia-manganite and a metal chromate there will be more or less inter-action between the manganese and the metal chromate.

As shown in FIGURE 5 the metal chromate can be applied, or mixed, with the mangano-chromia-manganite catalyst as discrete particles or aggregates of a number of metal chromate crystallites. Thus a finely ground metal chromate can be applied ot the catalyst. As shown in FIGURE 5 a supported mangano-chromia-manganite catalyst is indicated as in FIGURE 1 with the same numbers representing the same things as in that figure. A discrete metal chromate particle is shown in contact with the catalyst. This is made up of metal chromate particles 10 and 11 combined with alumina 8.

Additionally there can be used any of a wide variety of materials which are inert and relatively infusible by mixing these with the chromate. Particles can be made which are somewhat less fusible than the chromate particles themselves. Thus finely divided silica, silica aerogels, and clays such as bentonite can be used.

The discrete particles of chromate whether as an aggregate or as groups of crystallites can range in size down to the size of a single crystallite or two up to such a size that the particles upon moderate calcination to which the catalyst is normally subjected will not form a stable bond between the catalyst proper and the discrete particle. This size varies somewhat with the melting point of the chromate and other such variables but generally the particles should be less than 25 microns in greatest dimension.

In preparing discrete particles of chromate with suitable supports and inerts the amount of the chromate can range from 5 up to 100% though for practical reasons it will ordinarily be preferred if using a support to use about 25 to 75% of a chromate by weight based upon the total weight of the particles.

SUPPORTS

Supports suitable for use according to the present invention include various refractory bodies customarily used for this purpose in the art. There can be used for example:

(1) Porous ceramic spheres, tablets, or rings which have a softening or melting point in excess of 1200° C.
(2) Etched nickel, nichrome, and inconel wire
(3) Alundum
(4) Pumice
(5) Diaspore
(6) Bauxite
(7) Periclase
(8) Zirconia
(9) Titania
(10) Diatomaceous earth
(11) Calcium sulfate
(12) Barium oxide
(13) Calcium oxide
(14) Activated alumina granules.

The preferred refractory supports are:

Bauxite
Zirconia
Titania
Activated alumina

It is preferred that the surface area be at least 10 m.$^2$/g. with pore dimensions such that 40% are less than 200 Angstroms. It is even more preferred that the surface area be at least 80 m.$^2$/g. with pore dimensions of at least 60% less than 200 Angstroms. Mangano-chromia-manganite catalysts employing such preferred supports are described and claimed in U.S. application Serial No. 109,483, filed May 19, 1961. The catalyst support can be washed with water or with weak acids followed by washing with water as covered in a copending application of the assignee of the present case, Gilby U.S. application Serial No. 108,763 filed May 9, 1961.

The amount of catalyst applied to a support can be widely varied in accordance with usual practices but ordinarily will run from 1 to about 20% by weight based upon the weight of refractory. Less catalyst does not ordinarily give adequate activity and more catalyst is wasteful.

The catalyst containing the alkali metal chromate or bichromate whether tableted or supported as described can be calcined, if desired, at a temperature which does not go so high as to result in sintering of the catalyst components including the chromate. Temperatures from about 250 to 800° C. will be satisfactory and the times can run from a few minutes up to 30 minutes or an hour. Such calcination will be particularly desirable if there are heat-decomposable components in the catalyst.

In order that the invention may be better understood reference should be had to the following illustrative examples.

*Example 1*

(1) 250 parts by weight of activated alumina, 4–8 mesh, having a surface area of 200 square meters per gram and having 60% of the pores less than 600 A. in diameter is immersed in a solution-slurry of 16.5 parts by weight manganese, 6.3 parts by weight copper, 5.2 parts by weight Al$_2$O$_3$ all as nitrates and 30 parts by weight CrO$_3$ in 500 parts by weight of water at 50° C. for 15 minutes.

(2) The granules after immersion are removed, excess liquid is drained and then they are placed in a vessel permitting anhydrous ammonia to pass over and through the granules to cause precipitation of the complex chromates, chomites, manganates, and Al(OH)$_3$.

(3) The granules are next calcined at 400° C. for one hour.

(4) The calcined granules are then immersed in a solution composed of 6.3 parts by weight copper as the nitrate and 10 parts by weight CrO$_3$ and 500 parts by weight water at 60° C. for 15 minutes.

(5) The granules are calcined at 250° C. for one hour.

A catalyst as thus prepared is illustrated in FIGURE 1 of the drawings. The activated alumina serves as the support 1. Upon the support there is distributed the magano-chomia-manganite catalyst shown as cubes in the drawing at 2. This is formed in situ by reaction of chromium and manganese nitrates in situ upon calcination. The alumina which is added together with the manganese and copper serves as an interspersant for the copper chromite and since it is indistinguishable in crystalline form from the support it is also represented by the alumina shown at 1 in the drawing. The copper chromite co-catalyst is shown in the drawing at 6 as cubic in form and in FIGURE 4. The copper chromate employed according to the invention is illustrated in the drawing as a rhombohedral crystal 3 but it more often exists in amorphous form as shown at a number of places in the drawing at 4. In operation of the catalyst it is believed that the copper chromate becomes liquid at especially hot areas as shown at 5 in FIGURE 2.

The catalyst as prepared is effective for treatment of automobile exhaust resulting from burning leaded fuels. These exhaust gases normally contain nitrogen oxides, carbon monoxide, unburned hydrocarbons, and products of combustion of alkyl lead anti-knock agents. Ordinarily there are also halides present with the anti-knock agents. The lead compounds are illustrated in the drawing by PbCl$_2$ but actually include a wide variety of species including such compounds as lead bromides, lead oxyhalides, and various other complex lead compounds. The catalyst effectively converts the carbon monoxide to carbon dioxide and converts the hydrocarbons to carbon dioxide and water vapor. The nitrogen oxides are in part reduced to nitrogen. The lead compounds are in part removed but part pass through the catalyst unchanged.

*Example 2*

(1) A solution-slurry is prepared consisting of 16.5 parts by weight manganese, 6.3 parts by weight copper, both as the nitrates, 5.2 parts by weight Al$_2$O$_3$ as alumina hydrate in a particle size of 0.5 micron or smaller and in which the particles are composed, for the most part, of even smaller individual crystals, and 500 parts by weight water at 50° C.

(2) Ammonium hydroxide solution is added to cause complete precipitation as determined by a test of the supernatant liquid.

(3) The precipitate is filtered, then is calcined at 400° C. for one hour.

(4) The calcined powder is kneaded in equipment of the type used in the bakery industry in a proportion such that 10 parts by weight of the powder is kneaded with 100 parts by weight of nickel chromate (NiCrO$_4$, prepared by reacting nickel hydroxide with chromic acid) and sufficient water to produce a uniform thick paste.

(5) The paste from Step 4 is dried and calcined at 400° C. for one hour.

(6) The calcined paste from Step 5 is divided into three parts. The first part is mixed with graphite and pilled on a machine of the type used in the pharmaceutical industry to produce cylinders ⅛" x ⅛", whereas the second portion is used in the granular form and the third portion is extruded to form ⅛" x ⅛" cylindrical pellets. This catalyst has a chromate to catalyst ratio of 10 to 1. The catalyst in any form as derived in Step 6 is useful for the oxidation and abatement of fumes when leaded gasoline is used in internal combustion engines.

Example 3

(1) 250 parts by weight of activated alumina, 4–8 mesh, having a surface area of 200 square meters per gram and having 60% of the pores less than 600 A. in diameter are immersed in a solution-slurry composed of 10 parts by weight $CuCrO_4$ (prepared by reaction of copper carbonate with chromic acid) in 500 parts by weight water at 60° C. for 10 minutes.

(2) The granules after impregnation are heated to 250° C. for one hour.

(3) The heated granules are immersed in a solution composed of 2.5 parts by weight manganese, 3.2 parts by weight copper, 3.0 parts by weight nickel and 31.2 parts by weight chromium plus 5.2 parts by weight $Al_2O_3$ all as nitrates in 500 parts by weight water at 80° C. for 10 minutes.

(4) The catalyst is drained free of excess liquid, then is calcined at 450° C. for one hour. This preparation has a chromate to catalyst ratio of 1 to 10. It is useful for the abatement of fumes from automobiles burning leaded gasoline.

Example 4

(1) 250 parts by weight activated bauxite having 130 square meters per gram surface area and having 70% of the pores less than 600 A. in diameter, in 8–14 mesh size, is immersed in a solution-slurry of 5.5 parts by weight manganese, 3.0 parts by weight cobalt, 3.3 parts by weight zinc, 5.2 parts by weight $Al_2O_3$ and 18.9 parts by weight chromium all as the nitrates in 500 parts by weight water at 70° C. for 15 minutes.

(2) The granules are drained of excess liquid, then are calcined at 400° C. for one hour.

(3) The calcined granules are placed in a heated rotated vessel and sprayed with a solution-slurry of 15 parts by weight cadmium chromate in 100 parts by weight water to deposit the salt uniformly on the granules and to evaporate all the water.

(4) The granules are calcined at 300° C. for one hour. The catalyst thus prepared is useful for the abatement of fumes from automotive engines fueled with leaded gasoline.

Examples 5 through 11

Instead of the 15 parts by weight cadmium chromate specified in Step 3 of Example 4, use the following weights of the below tabulated chromates to produce an automotive exhaust catalyst as shown in Example 4.

*Example 5.*—15 parts by weight $CuCrO_4$.
*Example 6.*—15 parts by weight $NiCrO_4$.
*Example 7.*—15 parts by weight $CoCrO_4$.
*Example 8.*—15 parts by weight $ZnCrO_4$.
*Example 9.*—15 part by weight $Bi_2(CrO_4)_3$.
*Example 10.*—15 parts by weight $Th(CrO_4)_2$.
*Example 11.*—15 parts by weight $Ce_2(CrO_4)_3$.

Example 12

(1) 250 parts by weight activated silica, 4–8 mesh, having a surface area of 40 square meters per gram and having 50% of the pores less than 400 A. in diameter is immersed in a solution composed of 5.5 parts by weight manganese, 11.3 parts by weight cadmium, 5.2 parts by weight $Al_2O_3$ and 18.9 parts by weight chromium all as nitrates in 500 parts by weight water at 50° C. for 10 minutes.

(2) The granules are drained, then are calcined at 350° C. for one hour.

(3) They are then immersed in a solution-slurry of 25 parts by weight $NiCrO_4$ in 500 parts by weight water at 50° C. for 10 minutes.

(4) They are then calcined at 300° C. for one hour. The catalyst as thus prepared is useful for automotive fume abatement.

Examples 13 through 20

Instead of the 11.3 parts by weight cadmium stipulated in Step 1 of Example 12, use the following weights of the below tabulated metals to produce an auto exhaust catalyst as shown in Example 12.

*Example 13.*—6.3 parts by weight copper as the nitrate.
*Example 14.*—5.9 parts by weight cobalt as the nitrate.
*Example 15.*—5.6 parts by weight iron as the nitrate.
*Example 16.*—6.5 parts by weight zinc as the nitrate.
*Example 17.*—6.0 parts by weight tin as the nitrate.
*Example 18.*—13.4 parts by weight bismuth as the nitrate.
*Example 19.*—5.9 parts by weight nickel as the nitrate.
*Example 20.*—3.0 parts by weight cobalt plus 3.2 parts by weight copper both as the nitrates.

Example 21

(1) 250 parts by weight of activated alumina of the type used in Example 3 is immersed in a solution-slurry composed of 5.9 parts by weight cobalt as the hydroxide and 10 parts by weight $CrO_3$ as $H_2CrO_4$ together with 7.4 parts by weight $Cr_2O_3$ as the hydrated chromic oxide $[Cr(OH)_3]$ in 500 parts by weight distilled water at 65° C. for 10 minutes. The chromic oxide hydrate herein specified is converted, during the subsequent calcining, to finely divided $Cr_2O_3$ which becomes the first interspersant.

(2) The granules are dried, then are calcined at 350° C. for one hour.

(3) A solution-slurry is prepared consisting of 16.5 parts by weight manganese, 6.3 parts by weight copper both as nitrates, 30 parts by weight $CrO_3$ and 5.2 parts by weight $Al_2O_3$ as the hydrate, of the type used in Example 2, in 500 parts by weight water at 40° C. for 10 minutes.

(4) Ammonium hydroxide solution is added to the solution-slurry of Step 3 to effect complete precipitation as shown by a test of supernatant liquid.

(5) The precipitate is filtered and calcined at 400° C. for one hour.

(6) The granules from Step 2 are placed in a heated rotated vessel, then sprayed with a slurry composed of 25 parts by weight of powder from Step 5 and 50 parts by weight water so that the cobalt chromate is uniformly coated with the catalyst from Step 5 and the water is volatilized.

(7) The coated granules are heated at 250° C. for one hour. The catalyst as thus prepared is useful for the abatement and oxidation of fumes from automotive engines burning leaded gasoline.

Examples 22 through 29

Instead of the 7.4 parts by weight of $Cr_2O_3$ as chromium hydroxide used in Step 1 of Example 21, use the following weights of the below tabulated interspersants to produce an automobile exhaust catalyst as shown in Example 21.

*Example 22.*—7.4 parts by weight BeO as the nitrate.
*Example 23.*—7.4 parts by weight $Ce_2O_3$ as the nitrate.
*Example 24.*—7.4 parts by weight $HfO_2$ as the nitrate.
*Example 25.*—7.4 parts by weight $La_2O_3$ as the nitrate.
*Example 26.*—7.4 parts by weight $ZrO_2$ as the nitrate.
*Example 27.*—7.4 parts by weight $ThO_2$ as the nitrate.
*Example 28.*—7.4 parts by weight $TiO_2$ as a colloidal dispersion.
*Example 29.*—7.4 parts by weight $SiO_2$ as a colloidal dispersion.

Example 30

(1) 250 parts by weight of activated alumina of Example 3 is immersed in a molten mixture composed of 165 parts by weight of manganese, 63 parts by weight copper, 52 parts by weight $Al_2O_3$, and 156 parts by weight chromium all as nitrates at 150° C. for 10 minutes.

(2) The granules are drained, then are calcined at 400° C. for one hour.

(3) The calcined granules are immersed in a molten mixture of 126 parts by weight of copper as the hydroxide and 200 parts by weight of chromic acid $CrO_3$ at 130° C. for 10 minutes.

(4) The impregnated granules are drained, then are calcined at 300° C. for one hour. The catalyst thus prepared is useful for the abatement of fumes from automobiles fueled with leaded gasoline.

*Examples 31 through 36*

Instead of the 250 parts by weight activated alumina used in Step 1 of Example 30, use the following weights of the below tabulated supports to produce an automobile exhaust catalyst as shown in Example 30.

*Example 31.*—250 parts by weight activated silica having a surface area of 330 square meters per gram and having 50% of pores smaller than 100 A. in diameter.

*Example 32.*—250 parts by weight of silica-alumina having 40 square meters per gram surface area and having 50% of the pores smaller than 400 A. in diameter.

*Example 33.*—250 parts by weight of porous magnesium oxide having one square meter per gram surface area and having 3% of the pores smaller than 600 A. in diameter.

*Example 34.*—250 parts by weight of porous zirconium oxide having one square meter per gram surface area and 3% of the pores finer than 600 A. in diameter.

*Example 35.*—250 parts by weight porous titanium dioxide having a surface area of approximately one square meter per gram and having 3% of the pores smaller than 600 A. in diameter.

*Example 36.*—250 parts by weight of calcium sulfate having a surface area of 60 square meters per gram and having 50% of the pores smaller than 600 A. in diameter.

*Example 37*

(1) 50 parts by weight of an alloy composed of 80% nickel and 20% chromium in the form of wire 0.01 inch in diameter and one inch long is etched by immersion in a molten mixture of 200 parts by weight KOH and 400 parts by weight $KNO_3$ at 525° C. for one hour.

(2) The etched wire is drained, then washed to remove residual alkali.

(3) The etched wires are placed in a heated and rotated vessel, then are sprayed with a solution-slurry of 3.1 parts by weight zinc as hydroxide and 5 parts by weight $CrO_3$ in 25 parts by weight water. The zinc chromate produced by the reaction is retained on the surface of the wires in a uniform coating and the water is vaporized.

(4) The impregnated wires are calcined at 400° C. for one hour.

(5) The calcined filaments are again placed in the vessel of Step 3 and are then sprayed with a solution composed of 1.65 parts by weight manganese, 1.14 parts by weight chromium, 1.04 parts by weight $Al_2O_3$ all as nitrates in 25 parts by weight water. The salts are retained uniformly on the filaments and the water is vaporized.

(6) The coated wires are calcined at 400° C. for one hour. The catalyst thus prepared is useful for the abatement of automotive exhaust fumes from engines fueled with leaded gasoline.

*Examples 38 through 41*

Instead of the 50 parts by weight alloy in Step 1 of Example 37, use the following weights of the below tabulated alloys to produce an automobile exhaust catalyst as shown in Example 37.

*Example 38.*—50 parts by weight of an alloy composed of 60% nickel, 16% chromium, and 24% iron.

*Example 39.*—50 parts by weight of a stainless steel: 25 parts by weight nickel, 20 parts by weight chromium, and 55 parts by weight iron.

*Example 40.*—50 parts by weight of a stainless steel: 18 parts by weight nickel, 8 parts by weight chromium, and 74 parts by weight iron.

*Example 41.*—50 parts by weight of an alloy composed of 78 parts by weight nickel, 15 parts by weight chromium, and 7 parts by weight iron.

*Example 42*

A catalyst in which the chromate is present as discrete particles can be prepared as follows:

SUPPORTED CATALYST PREPARATION (1) 250 parts by weight of 4–8 mesh activated alumina is immersed in a solution-slurry of 16.5 parts by weight of manganese, 6.3 parts by weight of copper, both as the nitrates, plus 30 parts by weight of $CrO_3$ and 4 parts by weight titanium dioxide as a colloidal aqueous dispersion, all in 500 parts by weight of water at 90° C.

(2) The granules after mild agitation in the liquid for 15 minutes are allowed to drain. They are then exposed to a flow of anhydrous ammonia vapor and thereafter calcined at 400° C.

PREPARATION OF DISCRETE CHROMATE PARTICLES (3) 500 parts by weight of alumina hydrate, of particle size such that 100% is in the range of 5 to 25 microns (determined by elutriation), is placed in a heated and rotated vessel.

(4) A slurry-solution containing 100 parts by weight of zinc chromate is sprayed onto the alumina hydrate and dried.

(5) 250 parts by weight of the supported catalyst is mixed with 50 parts by weight of the discrete chromate particles. These are tumbled together in a heated atmosphere at 300° C. for about 30 minutes.

The products as thus prepared are suitable for use as a catalyst for treatment of leaded automobile exhaust gases.

Instead of using alumina hydrate as shown there can be used fibrous alumina monohydrate having the boehmite crystal lattice, pumice, diatomaceous earth, finely divided silica or silica aerogels, or other of the supports listed above in like amounts by weight with the chromate shown above or with other of the chromates and dichromates shown in this application to form discrete particles having a size not greater than 25 microns.

The catalyst as prepared in the example above using alumina as a support for both the mangano-chromia-manganite and the chromate is shown in FIGURE 5 in the drawing. The surface of the support shown at 7 and like materials in FIGURES 1 and 2 are designated by like numerals in FIGURE 5. In the catalyst of FIGURE 5, titanium dioxide is shown at 9 as an interspersant being in the form of tetragonal crystals.

In FIGURE 5, 10 and 11 refer to zinc chromate. A portion of one discrete particle is shown which is broken at 13 and the remainder of the particle is illustrated as being in contact with the catalyst surface. The portion of the particle shown represents aluminum hydrate at 8 and is illustrated further in FIGURE 3. As illustrated in the drawing there is some sintering and attachment between the discrete particle and the outer surface of the catalyst.

I claim:

1. As a catalyst for the treatment of combustion gases which contain such products as nitrogen oxide, carbon monoxide, and hydrocarbons and which additionally contain a lead compound; mangano-chromia-manganite catalyst having the empirical formula:

$$XCr_2O_n \cdot 2YMnO_m$$

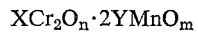

where the ratio of Y:X=3:0.5 to 3:30, $n$=2, 3 and 6 and $m$=1, 1.33, 1.5, 2 and 2.5, containing an interspersant of similar crystallite size selected from the group consisting of oxides of aluminum, titanium, chromium, magnesium, barium, calcium and strontium, and being supported upon a refractory upon which there is also supported a chromate selected from the group consisting of the chromates and dichromates of copper, iron, nickel, cobalt, cadmium, zinc, bismuth, thorium and cerium, the proportion of the metal chromate to the mangano-chromia-manganite by weight being 10:1 to 0.1:1, the amount of the interspersant being 5–75% by weight of the mangano-chromia-manganite, and the amount of mangano-chromia-manganite being 1–20% by weight of the refractory.

2. As a catalyst for the treatment of combustion gases which contain such products as nitrogen oxide, carbon monoxide, and hydrocarbons and which additionally contain a lead compound; mangano-chromia-manganite catalyst having the empirical formula:

$$XCr_2O_n \cdot 2YMnO_m$$

where the ratio of $Y:X=3:0.5$ to $3:30$, $n=2, 3,$ and $6$ and $m=1, 1.33, 1.5, 2,$ and $2.5$, containing an interspersant of similar crystallite size selected from the group consisting of oxides of aluminum, titanium, chromium, magnesium, barium, calcium and strontium and being supported upon a particulate refractory and being intermixed with discrete particles of a particulate refractory upon which there is supported a chromate selected from the group consisting of the chromates and dichromates of copper, iron, nickel, cobalt, cadmium, zinc, bismuth, thorium and cerium, the proportion of the metal chromate to the mangano-chromia-manganite by weight being 10:1 to 0.1:1, the amount of the interspersant being 5–75% by weight of the mangano-chromia-manganite and the amount of mangano-chromia-manganite being 1–20% by weight of the particulate refractory.

3. The catalyst of claim 1 wherein the refractory is selected from the group consisting of bauxite and alumina, the surface area of which is at least 10 m.²/g. and the pore dimensions are such that 40% are less than 200 Angstroms.

4. The catalyst of claim 2 wherein the refractory is selected from the group consisting of bauxite and alumina, the surface area of which is at least 10 m.²/g. and the pore dimensions are such that 40% are less than 200 Angstroms.

References Cited by the Examiner
UNITED STATES PATENTS

| | | | |
|---|---|---|---|
| 1,934,795 | 11/1933 | Frazer | 23—2.2 |
| 1,939,708 | 12/1933 | Larson | 252—471 |
| 1,995,274 | 3/1935 | Eversole | 252—465 X |
| 2,025,140 | 12/1935 | Wenzel | 23—2 |
| 2,031,475 | 2/1936 | Frazer | 23—2.2 |
| 2,071,119 | 2/1937 | Harger | 23—2.2 |
| 2,265,682 | 12/1941 | Bennett et al. | 252—458 |
| 2,588,260 | 3/1952 | Lynch et al. | 252—471 |
| 2,942,933 | 6/1960 | Batchelder et al. | 23—2.2 |
| 3,067,002 | 12/1962 | Reid | 23—2 |

MAURICE A. BRINDISI, *Primary Examiner.*

JULIUS GREENWALD, *Examiner.*